(12) United States Patent
Koleszar et al.

(10) Patent No.: US 9,179,475 B2
(45) Date of Patent: Nov. 3, 2015

(54) DISTRIBUTED AD HOC MESH NETWORK PROTOCOL FOR UNDERGROUND MINE AND HAZARDOUS AREA COMMUNICATIONS

(75) Inventors: Luke Koleszar, Lynchburg, VA (US); Steve Harrison, Lynchburg, VA (US); Tim Dechant, Monroe, VA (US); Paul Carpenter, Lynchburg, VA (US); Paul Schmidt, Forest, VA (US)

(73) Assignee: Innovative Wireless Technologies, Inc., Forest, VA (US)

( * ) Notice: Subject to any disclaimer, the term of this patent is extended or adjusted under 35 U.S.C. 154(b) by 155 days.

(21) Appl. No.: 13/257,378

(22) PCT Filed: Mar. 20, 2009

(86) PCT No.: PCT/US2009/037755
§ 371 (c)(1),
(2), (4) Date: Sep. 19, 2011

(87) PCT Pub. No.: WO2010/107441
PCT Pub. Date: Sep. 23, 2010

(65) Prior Publication Data
US 2012/0008542 A1    Jan. 12, 2012

(51) Int. Cl.
*H04H 20/71*    (2008.01)
*H04W 74/02*    (2009.01)
(Continued)

(52) U.S. Cl.
CPC .............. *H04W 74/02* (2013.01); *H04L 45/32* (2013.01); *H04W 40/00* (2013.01); *H04W 84/22* (2013.01)

(58) Field of Classification Search
CPC ...... H04W 74/02; H04W 84/18; H04W 56/00
USPC ......... 370/312, 328–336, 345, 352, 437, 445, 370/447–448, 461, 468; 455/41.2, 447; 713/168
See application file for complete search history.

(56) References Cited

U.S. PATENT DOCUMENTS

| 4,476,574 A | 10/1984 | Struven |
| 4,777,652 A | 10/1988 | Stolarczyk |

(Continued)

FOREIGN PATENT DOCUMENTS

| GB | 2235336 A | 2/1991 |
| WO | 2005043930 A | 5/2005 |

(Continued)

OTHER PUBLICATIONS

International Preliminary Report on Patentability of International Application No. PCT/US09/37753, dated Sep. 20, 2011, 10 pages.
(Continued)

*Primary Examiner* — Jeffrey M Rutkowski
*Assistant Examiner* — Romani Ohri
(74) *Attorney, Agent, or Firm* — New River Valley IP Law, PC; Michele L. Mayberry

(57) ABSTRACT

Methods and apparatus for forming and maintaining an ad hoc mesh network suitable for reliable voice and data communications in underground, industrial and other hazardous environments. This invention includes support for cooperative negotiation of dedicated transmission bandwidth for all fixed network nodes, determination of network time synchronization without a pre-determined time master, discovery and merging of adjacent ad hoc mesh networks, and routing techniques for voice, data and network status packets which react instantaneously to network topology changes. Furthermore this invention provides a reliable communication network for mobile nodes carried by personnel and sensor nodes that are fixed or mobile that supports voice, data and tracking/situation awareness. A current application for this technology is a coal mine communication system with an operations center to dispatch, monitor and control coal mine operation including communication and location of mine personnel, and environmental conditions in the mine.

22 Claims, 11 Drawing Sheets

(51) Int. Cl.
*H04L 12/721* (2013.01)
*H04W 40/00* (2009.01)
*H04W 84/22* (2009.01)

(56) References Cited

U.S. PATENT DOCUMENTS

| | | | |
|---|---|---|---|
| 5,020,135 A | 5/1991 | Kasparian et al. | |
| 5,230,080 A | 7/1993 | Fabre et al. | |
| 5,390,351 A | 2/1995 | Di Giulio et al. | |
| 5,432,838 A | 7/1995 | Purchase et al. | |
| 5,504,809 A | 4/1996 | Chalmers et al. | |
| 5,603,080 A | 2/1997 | Kaellander et al. | |
| 5,635,907 A | 6/1997 | Bernard et al. | |
| 5,697,067 A | 12/1997 | Graham et al. | |
| 5,952,940 A | 9/1999 | Matsumoto | |
| 5,987,328 A | 11/1999 | Ephremides et al. | |
| 6,041,042 A | 3/2000 | Bussiere | |
| 6,049,826 A | 4/2000 | Beser | |
| 6,075,798 A | 6/2000 | Lyons et al. | |
| 6,195,561 B1 | 2/2001 | Rose | |
| 6,226,389 B1 | 5/2001 | Lemelson et al. | |
| 6,324,395 B1 | 11/2001 | Khayrallah et al. | |
| 6,339,709 B1 | 1/2002 | Gladwin et al. | |
| 6,359,871 B1 | 3/2002 | Chung et al. | |
| 6,393,105 B1 | 5/2002 | Beveridge | |
| 6,553,130 B1 | 4/2003 | Lemelson et al. | |
| 6,744,754 B1 | 6/2004 | Lee | |
| 6,822,975 B1 | 11/2004 | Antosik et al. | |
| 6,850,502 B1 | 2/2005 | Kagan et al. | |
| 6,879,574 B2 | 4/2005 | Naghian et al. | |
| 7,016,377 B1 * | 3/2006 | Chun et al. | 370/493 |
| 7,024,157 B2 | 4/2006 | Waye et al. | |
| 7,043,195 B2 | 5/2006 | Bunton et al. | |
| 7,043,204 B2 | 5/2006 | Reagor et al. | |
| 7,050,831 B2 | 5/2006 | Meiksin et al. | |
| 7,110,756 B2 | 9/2006 | Diener | |
| 7,119,676 B1 | 10/2006 | Silverstrim et al. | |
| 7,149,472 B2 | 12/2006 | Reagor et al. | |
| 7,171,168 B2 | 1/2007 | Weiss | |
| 7,376,389 B2 | 5/2008 | Bassiri et al. | |
| 7,983,685 B2 | 7/2011 | Silverstrim et al. | |
| 8,244,260 B2 | 8/2012 | Silverstrim et al. | |
| 8,280,621 B2 | 10/2012 | Edwards et al. | |
| 8,385,322 B2 | 2/2013 | Colling et al. | |
| 8,527,172 B2 | 9/2013 | Moshchuk et al. | |
| 2003/0235175 A1 * | 12/2003 | Naghian et al. | 370/338 |
| 2004/0022416 A1 | 2/2004 | Lemelson et al. | |
| 2004/0090943 A1 | 5/2004 | Da Costa et al. | |
| 2004/0102219 A1 | 5/2004 | Bunton et al. | |
| 2004/0236547 A1 | 11/2004 | Rappaport et al. | |
| 2004/0266497 A1 | 12/2004 | Reagor et al. | |
| 2005/0079842 A1 | 4/2005 | Shi | |
| 2006/0015674 A1 | 1/2006 | Murotake | |
| 2006/0019679 A1 | 1/2006 | Rappaport et al. | |
| 2006/0046642 A1 | 3/2006 | Bassiri et al. | |
| 2006/0148514 A1 | 7/2006 | Reagor et al. | |
| 2007/0019561 A1 * | 1/2007 | Peterson | 370/252 |
| 2007/0021915 A1 | 1/2007 | Breed et al. | |
| 2007/0073861 A1 | 3/2007 | Amanuddin et al. | |
| 2007/0129081 A1 | 6/2007 | Seo et al. | |
| 2007/0161352 A1 | 7/2007 | Dobrowski et al. | |
| 2007/0165569 A1 * | 7/2007 | Kaminski et al. | 370/329 |
| 2007/0174467 A1 | 7/2007 | Ballou et al. | |
| 2007/0287474 A1 | 12/2007 | Jenkins et al. | |
| 2008/0019328 A1 | 1/2008 | Rudnick | |
| 2008/0031169 A1 | 2/2008 | Shi et al. | |
| 2008/0076383 A1 | 3/2008 | Barrett et al. | |
| 2008/0137589 A1 | 6/2008 | Barrett | |
| 2008/0137624 A1 * | 6/2008 | Silverstrim et al. | 370/338 |
| 2008/0143513 A1 | 6/2008 | Hannah | |
| 2008/0205417 A1 | 8/2008 | Li | |
| 2008/0219094 A1 | 9/2008 | Barakat | |
| 2008/0240209 A1 | 10/2008 | Levan | |
| 2008/0261520 A1 | 10/2008 | Bassiri et al. | |
| 2009/0016305 A1 * | 1/2009 | Lee et al. | 370/336 |
| 2009/0046675 A1 | 2/2009 | Pratt, Jr. et al. | |
| 2009/0140852 A1 | 6/2009 | Stolarczyk et al. | |
| 2009/0161687 A1 * | 6/2009 | Yu et al. | 370/436 |
| 2009/0170459 A1 * | 7/2009 | Karaoguz | 455/231 |
| 2009/0213816 A1 * | 8/2009 | Guo et al. | 370/336 |
| 2010/0105317 A1 * | 4/2010 | Palanki et al. | 455/9 |
| 2012/0008542 A1 | 1/2012 | Koleszar et al. | |
| 2012/0011365 A1 | 1/2012 | Schmidt et al. | |
| 2013/0278440 A1 | 10/2013 | Rubin et al. | |

FOREIGN PATENT DOCUMENTS

| | | |
|---|---|---|
| WO | 2008049170 A | 5/2008 |
| WO | 2009018212 A | 2/2009 |
| WO | 2010107440 A | 9/2010 |
| WO | 2010107441 A | 9/2010 |

OTHER PUBLICATIONS

International Preliminary Report on Patentability of International Application No. PCT/US09/37755, dated Sep. 20, 2011, 9 pages.
International Search Report of International Application No. PCT/US09/37753, dated May 20, 2009, 2 pages.
International Search Report of International Application No. PCT/US09/37755, dated Jun. 9, 2009, 3 pages.

* cited by examiner

DISTRIBUTED AD HOC MESH NETWORK PROTOCOL FOR UNDERGROUND MINE AND HAZARDOUS AREA COMMUNICATIONS

CROSS-REFERENCE TO RELATED APPLICATIONS

This application is a U.S. National Stage application of International Application No. PCT/US2009/037755, filed Mar. 20, 2009, the disclosure of which is hereby incorporated by reference herein in its entirety.

TECHNICAL FIELD

The present invention relates to a data protocol to implement a wireless voice and data communication system that for use in underground and hazardous areas for dispatch, remote supervision, and tracking of personnel, as well as, monitoring, asset control, and management of wireless sensors and equipment. More specifically the protocol enables the creation of a wireless ad hoc mesh network and facilitates the transport of communication packets for voice, data, text and network operations supporting normal and emergency operation.

BACKGROUND OF THE INVENTION

Recent events have indicated the need for reliable communication systems during emergencies in underground and hazardous work areas such as coal mines. During a mine disaster the current voice and data communication systems fail or shutdown so the conditions of personnel, environment and equipment is unknown which complicate recovery efforts. Past mining accidents have demonstrated that current communication systems are not sufficient to provide the support required to effectively handle evacuation and rescue operations. The 2006 MINER Act amends the Federal Mine safety and Health Act of 1977 stating underground coal mine operators must provide for post accident communication between underground and surface personnel via a wireless two-way medium within three years. Robust and reliable mine communications are critical for both mining operations and in the event of a mine emergency. The National Institute for Occupational Safety and Health (NIOSH) released a solicitation in late 2006 for an underground communication system that is highly reliable and provides in-mine and mine-to-surface voice and data communications to evaluate wireless mesh network technology as part of an underground communications system.

Prior art mesh communications systems for use in hazardous environments have used the standard Institute of Electrical and Electronics Engineers (IEEE) 802.11 wireless protocol to transfer status and multimedia information as well as centrally generated and controlled routing tables to control packet latency in a multi-cast application with a changing network topography. The IEEE802.11 wireless protocol supports an infrastructure mode in which mobile nodes are connected to a coordinating master referred to as the Access Point (AP) and an ad hoc mode in which mobile nodes form peer-to-peer connections with no preconfigured network topology. The original 802.11 protocol had very limited Quality of Service (QoS) mechanisms. A Point Coordination Function (PCF) was specified in which each AP sends a poll to each client one at a time to provide a contention-free transmission opportunity. This media access control (MAC) method has not been implemented in many APs and is bandwidth inefficient since it always requires a poll packet be sent to the client for each high priority packet to be sent to the AP. The 802.11e amendment was incorporated into the 802.11 standard in 2007. It specifies two additional mandatory QoS MAC methods. The first method is the Enhanced Distributed Channel Access (EDCA) method which specifies traffic priority levels and assigned transmission opportunities for each priority level. This method does protect against collisions (and subsequent loss) of high-priority packets due to low-priority packets, however it does not protect against collisions of packets with the same priority from multiple clients. The second QoS method introduced by 802.11e is an infrastructure-only method referred to as Hybrid Coordinator Function Controlled Channel Access (HCCA). This QoS method is similar to the PCF method with the exceptions of the timing of the contention-free transmission opportunities is not limited to certain inter-beacon time slots and the AP is able to poll a client for a particular Traffic Class (TC) to enable session-aware QoS. This HCCA method suffers from the same bandwidth inefficiency as PCF. In addition to the lack of an efficient method to guarantee transmission opportunities for high priority packets between a client and an AP (infrastructure mode) or between two clients (ad hoc mode), the 802.11 solutions do not provide the additional necessary capability to forward said packet to the next destination in the network in an efficient and contention-free manner. Therefore, what is needed is a method and apparatus for establishing dedicated transmission opportunities for each fixed node in a given cluster to forward packets to the next node in the cluster as well as contention-based transmission opportunities for fixed nodes and mobile nodes to join the cluster.

Furthermore, the efficient routing of packets across a mesh network is a vital component in determining the packet latency through the network. Prior art mesh network communication systems for hazardous environments have utilized routing tables generated from a centralized location and periodically propagated across the network using high priority MAC message mechanisms, resulting in a delay in routes being modified as conditions change. There is also a need in the art for an intelligent de-centralized flood routing technique to ensure mobile units can seamlessly roam throughout the network.

SUMMARY OF INVENTION

This invention relates to a computer-implemented method for providing a protocol enabling reliable communications between elements of an ad hoc mesh network which include at least fixed mesh nodes, mobile mesh radio nodes and gateway nodes. One of the fixed mesh nodes is designated a time master node, and an intelligent de-centralized flood routing technique is used to ensure that units containing mobile mesh radio nodes can seamlessly roam throughout the network. Each fixed mesh node transmits over a pair of bonded, time-synchronized channels, one of which is a voice channel while the other is a data channel.

The protocol includes at least one super-frame time interval. If there is more than one super-frame time interval, they are all of equal duration and synchronized with the time master node. There are at least two time slots within the primary level of each super-frame, one of which is assigned to be a first level contention access period time slot and the second of which is assigned to be a period during which fixed mesh nodes may transmit network packets to neighboring fixed mesh nodes and to any mobile mesh radio nodes with which they are associated. The protocol has multiple levels of time slots, each of which is assigned to a specified type of activity to account for the various functions to be provided by the protocol.

BRIEF DESCRIPTION OF DRAWINGS

The foregoing and other objects, aspects and advantages of the invention will be better understood from the following detailed description of the invention with reference to the drawings, in which.

DETAILED DESCRIPTION OF THE INVENTION

This invention helps to provide reliable voice and data communications with personnel and sensors within a hazardous area and also with a remote operation center during normal operations as well as during an event that requires shut down of normal operations. The invention allows rescue teams to determine personnel status, where personnel are located, and environment conditions such as water, toxic gases, and oxygen availability in the hazardous area. The wireless voice/data network protocol of the present invention comprises a number of intercommunicating blocks which automatically form a Wireless Mesh Network (WMN) 100 that can reform when links are removed or blocked.

Figure 1:
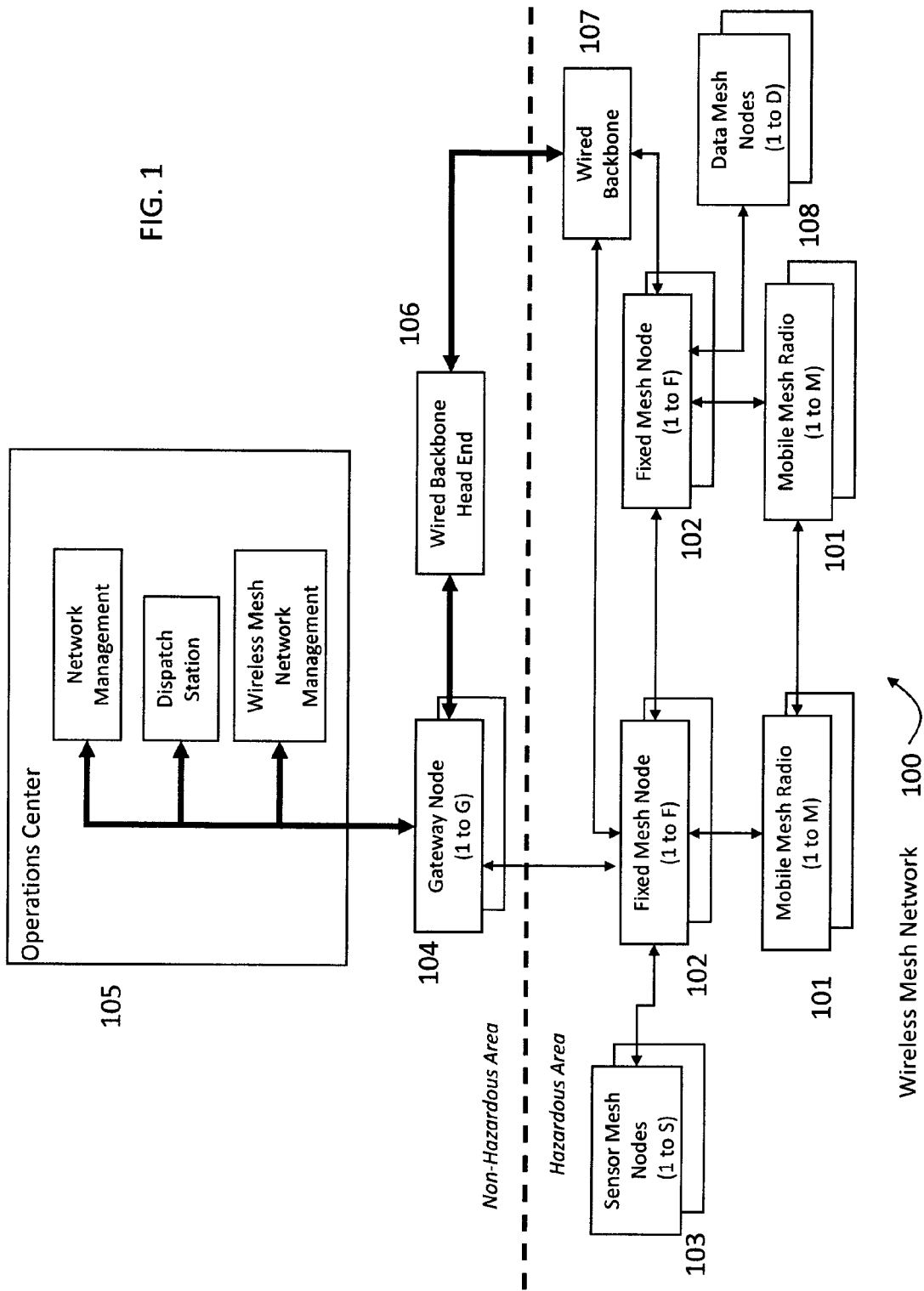
FIG. 1 illustrates the concept of a wireless voice and data ad hoc mesh network deployment in a logical design block diagram view according to an embodiment of the present invention.

The system and method of the present invention provide a voice/data network protocol to supply Operations Center staff with event detection information, voice and text communications, and personnel location information, as illustrated in FIG. 1. In a preferred embodiment, four types of nodes are provided in the network:

Fixed Mesh Node FMN 102 is a stationary dual-transceiver mesh radio unit operates on the WMN 100. Multiple units operate together to form the semi-static infrastructure for the WMN 100. Each FMN 102 has the capability to coordinate individual clusters within the wireless mesh network WMN 100 and route data through the network between mobile nodes and to a Gateway Node (GWN) 104. An FMN 102 can also communicate through a wired backbone headend 106 with a wired backbone 107, such as a leaky feeder system, as well as form the core links for WMN 100.

GWN 104 supports the transfer of information between WMN 100 and the infrastructure for a wide area network (WAN). GWN 104 is a highly modular design that is normally implemented as a fixed device but could be a mobile device. GWN 104 includes all of the functions of a full function FMN 102.

Mobile Mesh Radio (MMR) 101 is a portable device carried by personnel that allows them to have voice and data communication with a Network Operations Center 105 and/or other personnel equipped with an MMR 101. MMR 101 can also be a relay link between another MMR 101 and an FMN 102, or between a sensor mesh node (SMN) 103 and an FMN 102.

SMN 103 connects data from various types of sensors such as light, noxious gas, acoustic, temperature, oxygen, and imaging sensors into WMN 100 by communicating through one or more FMNs 102 or one or more MMRs 101 to forward information from a sensor to network operations center (NOC) 105.

Other units may also be added to WMN 100. For example, a Data Mesh Node may be used to communicate with equipment operating in a mine or hazardous area. Thus, use of this invention is not limited to the types of nodes specifically mentioned.

1. Definitions

The following terms are used throughout this description with the following meanings:

Node—This term is used to denote a Fixed Mesh Node (FMN) 102, Gateway Node (GWN) 104, Mobile Mesh Radio (MMR) 101 or Sensor Mesh Node (SMN) 103.

Time Master—This term refers to the node which is providing the protocol super-frame timing to all the other nodes in a cluster. This node may have direct children nodes and if it does it may have inherited children through these children. Its direct children of the Time Master will directly synchronize to the time master's slot timing while the inherited children will synchronize to their respective parents slot timing thus inheriting the time master's timing with some offset due to propagation delay. For example, in FIG. 2, Node 1 is the Time Master; Node 2 is the only direct child of Node 1 while Nodes 3 and 4 are the inherited children of Node 1 through Node 2.

Figure 2:
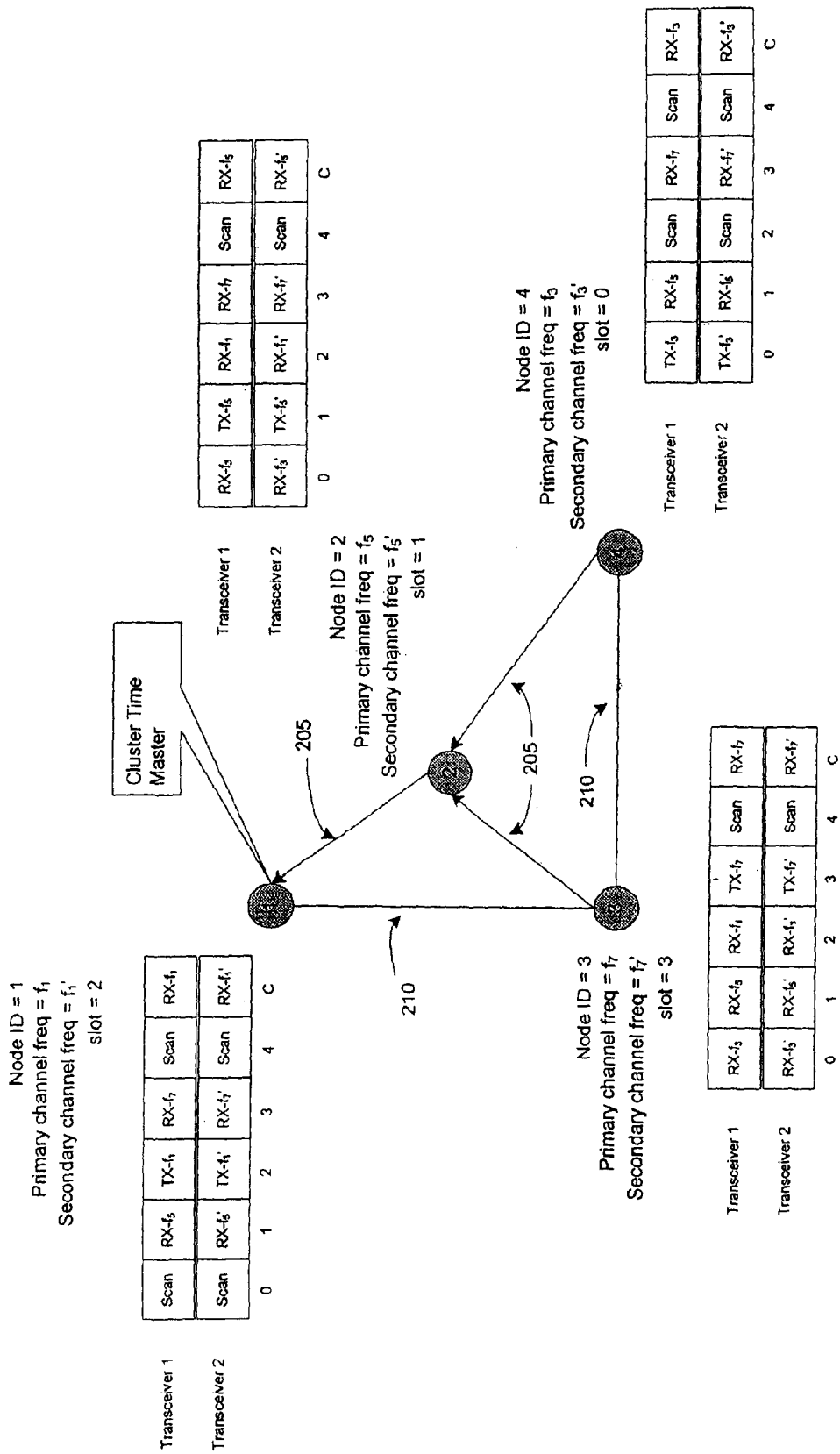
FIG. 2 illustrates an example of a cluster of Fixed Mesh Nodes, depicting the parent-child relationships as well as the transceiver operation during a typical protocol super-frame.

Cluster—A cluster is a group of nodes which all have the same time master. Nodes in a cluster do not necessarily (and often will not) have direct RF connectivity to all the other nodes in the cluster. Information packets between clusters pass through a pair of gateways if a gateway exists in each cluster. FIG. 2 illustrates a cluster of FMN's containing nodes 1, 2, 3 and 4.

Parent Node—A parent node is a node which is providing a time reference to a child node. In FIG. 2, a parent-child relationship is illustrated by the lines towards which indicator 205 points in which the arrowhead for each of the lines points towards that node's parent. Thus, node 1 is the parent of node 2 while node 2 is the parent of node 3 and node 4. The numbering system for the nodes is described in further detail below.

Child Node—A child node is a node which is basing its time reference on a parent node. The only node in a cluster which is not a child to some parent is the time master.

Peer Node—A peer node is a node which has the same time reference as a given node but is not a child or parent of that node. In FIG. 2, a peer relationship is illustrated by a line without arrowheads, such as line 210.

Observing Node—A node which is examining the frequency spectrum for adjacent nodes, parent node, children nodes, peer nodes, and known nodes.

Known Node—A node is said to be a known node to an observing node if its presence is known by the observing node but it is not in the same cluster as the observing node.

Neighbor—A node is considered to be a neighbor of another node if it is the parent, a child or a peer to that node. Known nodes are not considered to be neighbors.

Orphan Node—An orphan node is a node which is currently operating in a dedicated search mode. In this mode it will continually search for any node with a higher time master ranking than it has itself.

Orphan Cluster—An orphan cluster is a cluster which does not contain a gateway.

Wireless Mesh Network (WMN) 100—Refers to the mesh network in its entirety, including FMNs 102, GWNs 104, MMRs 101 and SMNs 103

2. Functional Overview

The mesh protocol provides a means to form and maintain the fixed network (FMNs 102 and GWNs 104) and provides access into the network for mobile nodes (MMRs 101 and SMNs 103). The fundamental purpose of this network is to transmit application layer packets between various points in the system with the highest reliability and lowest latency which can be achieved given a certain system cost.

Since a GWN 104 operates as a mesh network member in a manner which is indistinguishable from an FMN 102 on the mesh radio side, the term FMN 102 will be used in the remainder of this description when referencing functionality common to both FMN 102 and GWN 104.

3. Frequency and Slot Assignment

An important aspect of this invention is the ability to form a mesh network which can provide dedicated bandwidth for each FMN 102 within a cluster. This dedicated bandwidth is essential in the efficient routing of voice communications which is very sensitive to any system latency. When an FMN 102 attempts to join an existing cluster of FMN's 102 it sends an Association Request to the FMN 102 which it has determined to be its best parent. The potential parent responds with an Association Response indicating whether it accepts or rejects the joining FMN 102 as a child. In the case of the former, the parent FMN 102 provides a channel and slot assignment on which the joining FMN 102 is to operate. In this way the bandwidth within a cluster can be managed such that, within a given RF collision domain, each cluster member has a unique RF channel/time slot combination for it to transmit its FMN-to-FMN messages in time slots 310 within super-frame 305, shown in FIG. 3.

4. Mesh Operation

FIG. 2 illustrates the operation of a small mesh consisting of 4 nodes. For purposes of this description each node is referenced by its ID, i.e. Node 1 is the node with an ID of 1. Each node has a frequency pair associated with it, one for the primary channel and one for the secondary channel. This frequency pair is "bonded" since there is a fixed relationship between them and if one is known, the other can be easily derived. For example, Node 3 in FIG. 2 operates with a primary frequency of $f_7$ and a secondary frequency of $f_7'$. Each node learns the frequency pair associated with each of its neighbors during cluster formation.

In addition each node has a first level FMN-to-FMN time slot 310 associated with it. For example Node 4 in FIG. 2 has time slot 0 associated with it. The time slot for each member of a cluster is assigned during cluster formation.

As illustrated in FIG. 2, during a typical super-frame, each node will tune its primary and secondary transceiver frequencies to its assigned frequencies during its assigned first level FMN-to-FMN time slot 310 and transmit any packets it has queued for transmission on that channel as described previously. In addition, during a typical super-frame, for each first level FMN-to-FMN time slot 310 which is assigned to a neighbor, a node will tune its transceivers to the frequencies associated with that neighbor and attempt to receive packets from that neighbor. Also during a typical super-frame, each node will tune its transceivers to its assigned frequencies during the first level contention access period (CAP) time slot 315, shown in FIG. 3 and explained further below, attempting to receive packets from transmitting mobile nodes or other FMNs 102 which are attempting to join the cluster. Finally, during any first level FMN-to-FMN time slot 310 which is not currently assigned to a neighbor, a node will use both transceivers to scan for other clusters which might provide an improved time metric.

Exceptions to this typical super-frame operation are made in order to allow nodes to discover other nodes associated with other clusters when these other nodes are operating in time slots which overlap the time slots assigned to discovering node or the discovering node's neighbors. These exceptions are known as puncturing events. A node will periodically puncture its own first level FMN-to-FMN time slot 310, as well as its neighbors' assigned time slot(s) and the first level CAP time slot 315. During a puncturing event, the node performing the puncturing will replace the typical operation described in the preceding paragraph with a scan operation. The puncturing schedule for the two transceivers for a given node is independent.

5. Routing

In order to support multicast communications, seamless mobility for mobile nodes such as MMRs 101 and SMNs 103 and redundant communications links, the routing of voice packets through the mesh network must be dynamic. This invention accomplishes this using an intelligent flood routing technique.

Mobile nodes transmit and receive with the FMN 102 which provides the best communications path at that given time; this FMN 102 is considered to be the mobile node's parent at that time. As a mobile node travels through the network its position relative to a given parent changes and therefore the RF characteristics change. When the quality of the link between the mobile node and its parent FMN 102 has degraded such that it is below a programmable threshold of acceptable operation, the mobile node seeks another parent which can provide a higher quality communication link. This results in the entry point of the voice and data packets into the network changing with time.

In addition to mobility, the occasional removal of one or more FMNs 102 from the network is an operational reality. This can occur due to maintenance action, failure of a unit or loss of line of sight between units due to obstructions or cave-in. Each of these scenarios can cause a modification to the current route which packets are taking through the network. Since the intelligent flood routing algorithm used by the current invention does not attempt to establish any static or semi-static routes for communication packets from a given source to a given destination, it is able to immediately react to each of these scenarios with minimal or no loss of data.

Flood routing is understood to those skilled in the art to be a technique by which a router forwards packets received on all interfaces except the one on which said packet was received. This is known to artisans as a technique which can be used to add multicast support to a mesh network. However, this technique can result in large amounts of redundant traffic since there are many possibilities for circular routing loops. The present invention eliminates circular loops by storing a history of data packet sequence numbers and voice packet timestamps. As each data packet is forwarded, its sequence number is recorded in memory along with a timestamp indicating the current system time. If another data packet is received with this same sequence number before a programmable timeout period, this packet is discarded. However if the sequence number of the data packet does not match any stored sequence number of recently forwarded packets, the packet is forwarded and the timestamp associated with that sequence number is replaced with the current time.

A similar procedure is used for filtering duplicate voice packets, however timestamps are used instead of sequence numbers to eliminate the possibility of forwarding a voice packet associated with a given voice stream which is significantly older than a previously forwarded voice packets associated with the same voice stream. Each voice packet contains two timestamps, one which indicates the time at which the first voice packet of the associated voice stream was transmitted into the network and one which indicates the time at which this specific packet of the stream was transmitted into the network. As each voice packet is received by a FMN 102 it will only be forwarded if no other voice packet was recently forwarded with the same voice stream origination time and a packet origination time which is greater than or equal to the packet origination time in packet under consideration. In a preferred embodiment of this invention the definition of "recently" is controlled by a configurable timeout parameter.

6. Super-Frame Format

Figure 3:
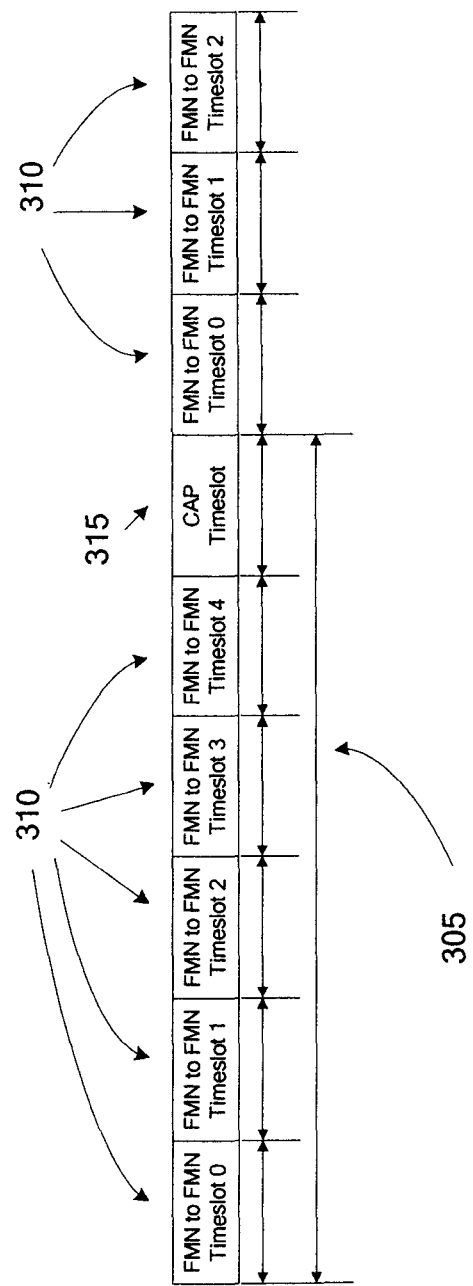
FIG. 3 illustrates the partitioning of a protocol super-frame into first level time slots as defined by this invention.

All transmissions on the mesh network are strictly time synchronized to increase the likelihood of successful transmission of any given packet. Each FMN 102 utilizes a pair of bonded channels on which it will transmit. FIG. 3 illustrates the super-frame timing used on both of these channels. The timing of the super-frames 305 on each channel is synchronized to prevent an FMN 102 from attempting to receive on one channel while it is transmitting on another channel. The timing of the super-frame 305 for all the nodes in a cluster is synchronized with the time master for that cluster providing the time reference.

In one embodiment of this invention each super-frame 305 is 60 ms in duration and is subdivided into six 10 ms first level time slots. The first five first level 10 ms time slots 310 are dedicated as first level FMN-to-FMN time slots and the sixth 10 ms first level time slot 315 is dedicated as the first level Contention Access Period (CAP) time slot. The purpose of the first level FMN-to-FMN time slot 310 is to provide a guaranteed time period during which a FMN 102 can transmit network packets to its neighboring FMN(s) 102 and to any mobile units (MMRs 101 or SMNs 103) which may be using it as their current parent.

Figure 4:
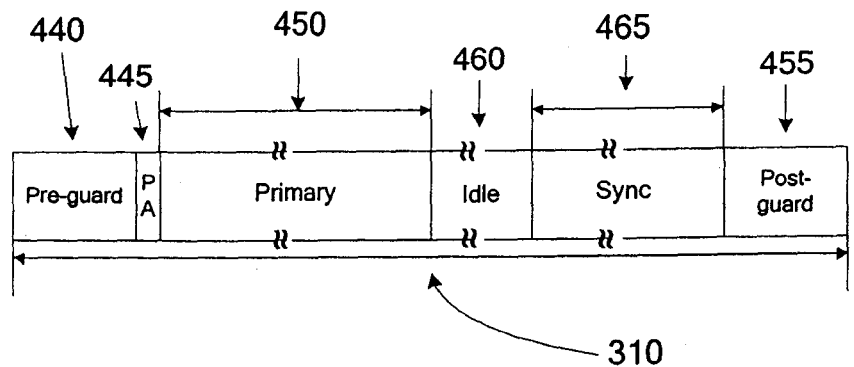
FIG. 4 illustrates the partitioning of a first level FMN-to-FMN time slot into second level time slots as defined by this invention.
Figure 17:
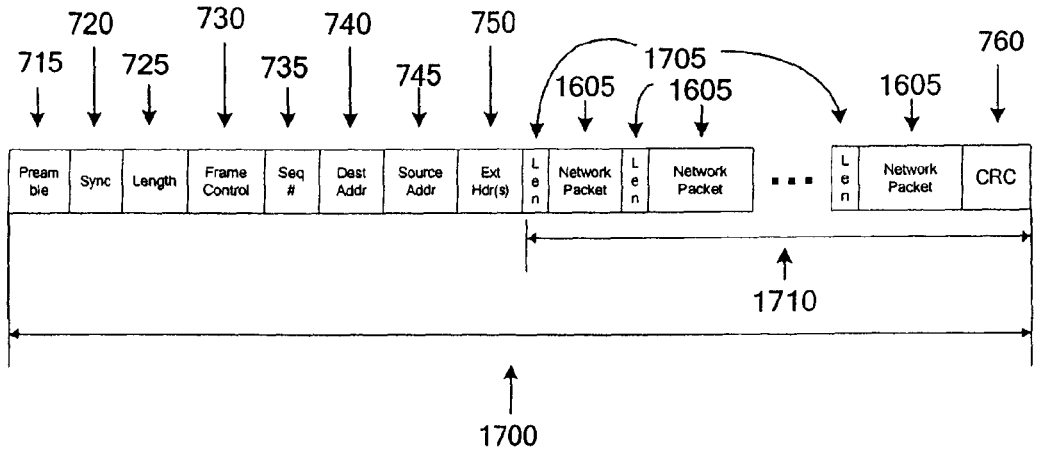
FIG. 17 illustrates the partitioning of a first level Concatenated Data Frame Packet into second level, third level and fourth level frames as defined by this invention.

The first level FMN-to-FMN time slot 310 is sub-divided into six second level time slots as illustrated in FIG. 4. Each of these second level time slots has an assigned operation which will be executed by the FMN which is assigned the specific time slot. The second level Pre-guard time slots 440 allows for clock drift between network components, the assigned FMN does not transmit or receive during this second level time slot. The duration of the second level Pre-guard time slots 440 is fixed for a given network based on the clock accuracy of the components within the network. The second level PA Ramp time slot 445 is a time slot set aside to allow the Power Amplifier (PA) component of the FMN to reach full output power. The assigned FMN turns on its transmitter circuitry at the beginning of this second level time slot and then delays for the duration of the second level time slot without transmitting. The duration of the second level PA Ramp time slot 445 is fixed for a given network. The third second level time slot is the second level Primary time slot 450. The assigned FMN uses the second level Primary time slot 450 to transmit queued network packets to its listening neighbors. Typically, a single first level Concatenated Data Frame 1700, as shown in FIG. 17, is used to transfer all the network packets. The duration of the second level Primary time slot is variable depending on the number of network frames in the assigned FMN's 102 outgoing queue. The second level Primary time slot 450 is followed by an second level Idle time slot 460 during which the FMN 102 can power down its transmitter to conserve power. The duration of the second level Idle time slot 460 is fixed for a given FMN 102; it may be adjusted during network deployment to provide a method to trade-off network formation/re-formation time with FMN power consumption. The second level Idle time slot 460 is followed by the second level Sync time slot 465 during which the assigned FMN 102 will transmit first level PHY frames 701 containing third level Sync frames 1800. These Sync frames 1800 are used to aid scanning FMNs 102 or mobile nodes to find and synchronize with the network. The number of Sync frames 1800 to be sent in a given second level Sync time slot 465 may vary between subsequent super-frames depending on the durations of the second level Idle time slot 460 and the second level Primary time slot 450. The second level Post-guard time slot 455 follows the second level Sync time slot 465. The FMN 102 uses the second level Post-guard time slot 455 to turn off its transmitter and switch to receive mode for the next first level time slot 310 or 315.

The purpose of the first level CAP time slot 315 is to provide an opportunity for other FMNs 102 to transmit Child Association request frames to a potential parent FMN 102 and to provide an opportunity for mobile nodes to transmit frames containing network packets into WMN 100. The exact format for first level CAP time slot 315 depends on whether that particular bonded channel is dedicated to voice or data. For a given FMN 102, one of the bonded channels is designated as the data channel due to the first level CAP time slot 315 being formatted into second level CAP data time slots 505, as illustrated in FIG. 5, and the other channel in the pair is designated as the voice channel due to the first level CAP time slot 315 being formatted into second level CAP voice time slots 605, as illustrated in FIG. 6.

Figure 5:
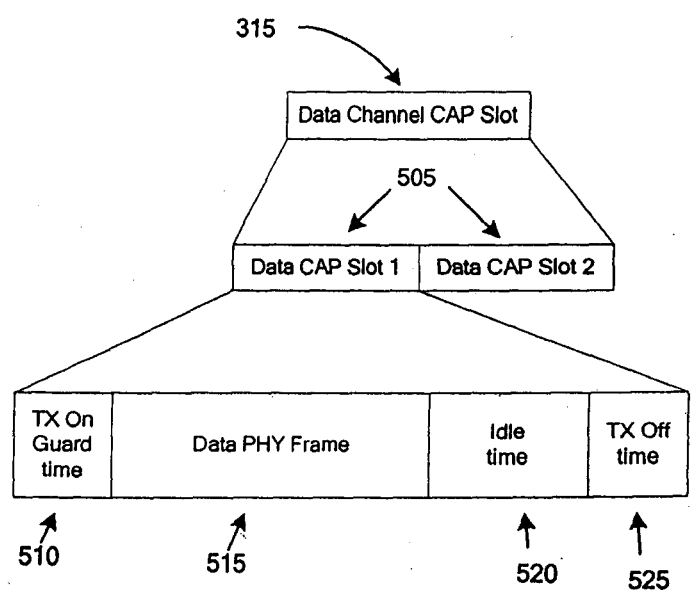
FIG. 5 illustrates the partitioning of a first level Data Channel Contention Access Period (CAP) time slot into second and third level time slots as defined by this invention.

As FIG. 5 also illustrates, the second level CAP data time slots are further comprised of a third level TX On Guard time slot 510, a third level data Physical Layer (PHY) frame time slot 515, a third level data Idle time slot 520 and a third level data TX Off Guard time slot 525. Third level data TX On Guard time slot 510 and third level data TX Off Guard time slot 525 instruct the radio transmitting in the CAP slot time to turn its transmit circuitry on and off, respectively. Third level data Idle time slot 520 is the period of time after the transmitting radio has transmitted the last bit of the variable length third level data frame time slot 515 and before the beginning of third level data TX Off Guard time slot 525.

Figure 6:
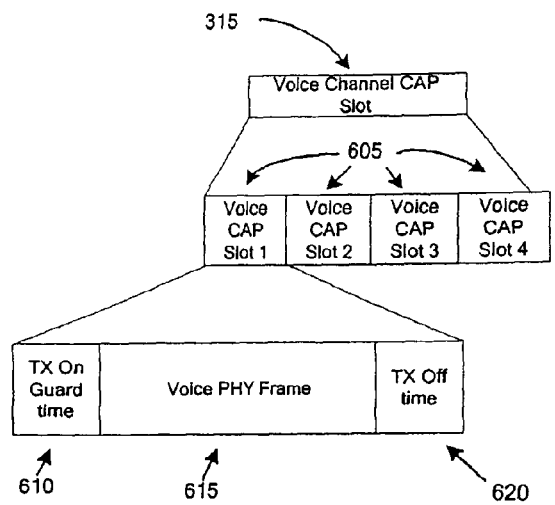
FIG. 6 illustrates the partitioning of a first level Voice Channel Contention Access Period (CAP) time slot into second and third level time slots as defined by this invention.
Figure 7:
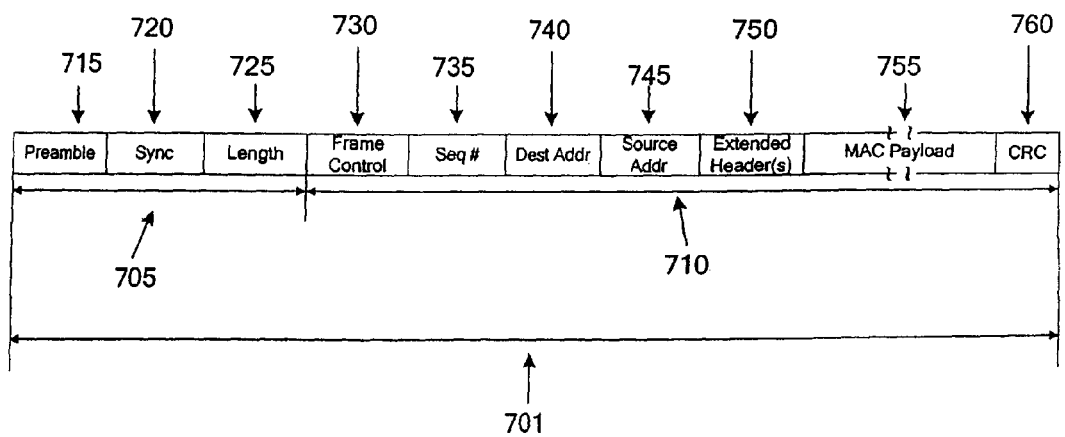
FIG. 7 illustrates the partitioning of a generic first level frame into second and third level frames as defined by this invention.

Similarly FIG. 6 illustrates, the second level CAP voice time slots 605 are further comprised of a third level voice TX On Guard time slot 610, a third level voice Physical Layer (PHY) frame time slot 615, a third level voice Idle time slot 620 and a third level voice TX Off Guard time slot 620. Third level voice TX On Guard voice time slot 610 and third level voice TX Off Guard time slot 625 instruct the radio transmitting in the CAP slot time to turn its transmit circuitry on and off, respectively [0034] FIG. 7 illustrates the general format of a first level PHY frame 701. This frame format applies to both the third level Data Physical Layer (PHY) frame time slot 515 and the third level Voice Physical Layer (PHY) frame time slot 615. A first level PHY frame 701 is further comprised of a second level PHY header frame 705 and a second level MAC frame 710. The second level PHY header frame 705 further consists of a third level Preamble frame 715, a third level Sync frame 720 and a third level Length frame 725.

The third level Preamble frame 715 is encoded as a set of alternating 1 and 0 bits. The purpose of this third level frame is to provide a means for receiving radios to reliably obtain bit synchronization on the incoming bit stream.

The third level Sync frame 720 consists of a unique bit pattern which is preconfigured into all devices in WMN 100. This third level frame is used by a receiving radio to obtain slot synchronization.

The third level Length frame 725 indicates to the receiver the number of bytes to expect in the second level MAC frame 710.

The second level MAC frame 710 contains several third level frames which provide control and error correction functions. These third level frames include a third level Frame Control frame 730, a third level Sequence Number frame 735, a third level Destination Address frame 740, a third level Source Address frame 745, an third level Extended Header frame 750, a third level MAC Payload frame 755 and a third level a cyclic redundancy check (CRC) frame 760.

The third level Frame Control frame 730 provides several fourth level frames which inform the receiving radio of the purpose and format of the remainder of second level MAC frame 710. The format and purpose of these fourth level frames are discussed in a subsequent section.

Third level Sequence Number frame 735 allows the acknowledgement of individual MAC packets and the filtering of duplicate packets. The value of this third level frame is set by the transmitter of the packet. Whenever a unicast acknowledgement is sent to indicate the status of the reception of this packet the value of the third level Sequence Number frame 735 in the Acknowledgement is set to this value.

Third level destination address frame 740 specifies the network address of the intended recipient of this packet. The length of this third level frame is determined by fourth level Destination Mode frame 845, shown in FIG. 8, of third level frame control frame 730. In the preferred embodiment of this invention certain Destination Address values are reserved to indicate a packet is a broadcast packet and should therefore be processed by all receiving nodes.

Third level Source Address frame 745 specifies the network address of the transmitting unit. The length of this third level frame is determined by fourth level Source Mode frame 855, shown in FIG. 8, of third level Frame Control frame 730.

The purpose of third level Extended Header(s) frame 750 is to provide a mechanism by which the sender can dynamically expand the MAC header with additional network information when needed. The format of this third level frame is described in a subsequent section.

The purpose and content of third level MAC Payload frame 755 is context dependent. The types of MAC packets which are supported on the WMN 100 are described in a subsequent section.

Third level CRC frame 760 provides the receiver with a method for detecting bits errors which may have occurred in the demodulation of the data bits in other third level frames 730, 735, 740, 745, 750 and 755. This third level frame is 16 bits in length and is calculated using the standard CCITT CRC16 parameters.

Frame Control Field

Figure 8:
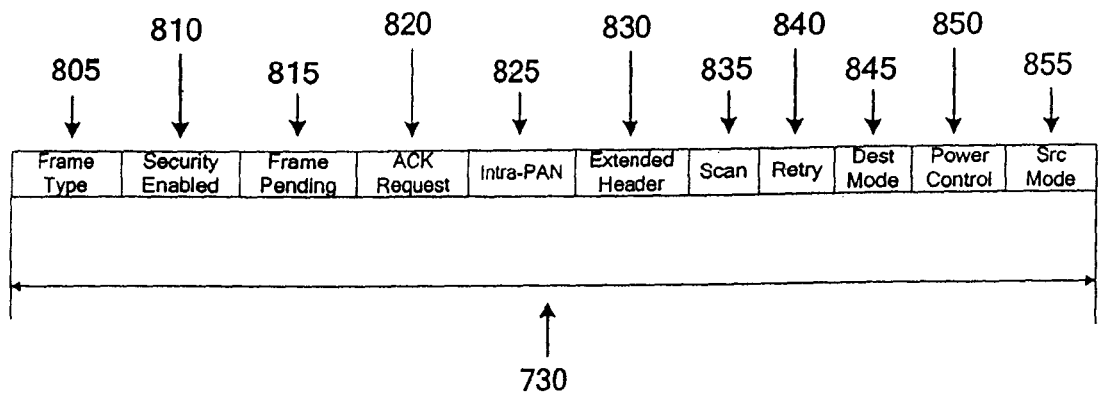
FIG. 8 illustrates the partitioning of a third level Frame Control Field frame into fourth level frames as defined by this invention.

The third level Frame Control frame 730 consists of several fourth level frames which inform the receiving radio of the purpose and format of the remainder of the second level MAC frame 710. FIG. 8 illustrates the format of the third level Frame Control frame 730. The fourth level frames within the third level Frame Control frame are shown in FIG. 8 and comprise the fourth level Frame Type frame 805, the fourth level Security Enabled frame 810, the fourth level Frame Pending frame 815, the fourth level ACK Request frame 820, the fourth level Intra-personal area network (Intra-PAN) frame 825, the fourth level Extended Header indication flag frame 830, the fourth level Scan frame 835, the fourth level Retry frame 840, the fourth level Destination Mode frame 845, the fourth level Power Control frame 850 and the fourth level Source Mode frame 855.

The fourth level Frame Type frame 805 indicates the purpose of this second level MAC frame 701 and therefore indicates the format of the third level MAC Payload frame 755. The three fourth level MAC frame types used on this system are Single Data Frames, Concatenated Data Frames and Sync frames.

The fourth level Security Enabled frame 810 indicates whether or not MAC layer security is enabled.

The fourth level Frame Pending frame 815 indicates whether the sending unit has additional frames to send to the same destination address.

The fourth level ACK Request frame 820 indicates whether the sending unit is requesting a MAC layer acknowledgement of this frame.

The fourth level Intra-PAN frame 825 is reserved for future intra-PAN communications.

The fourth level Extended Header indication flag frame 830 is a flag which, when set to true, indicates whether or not one or more fourth level extended header frames follows the third level Source Address frame.

The fourth level Scan Notify frame 835 indicates whether or not the transmitter will be performing a scan operation in the next time slot or will be performing a normal transmission in the time slot.

The fourth level Retry frame 840 indicates whether or not the first level frame is a first transmission of the contained information or a retry of the transmission of the information.

The fourth level Destination Mode frame 845 indicates number of bits in the third level Destination Address frame 740.

The fourth level Power Control frame 850 is used to indicate the power level at which the transmitter is transmitting the packet.

The fourth level Source Mode frame 855 indicates the number of bits in the third level Source Address frame 745.

Extended Headers

Figure 9:
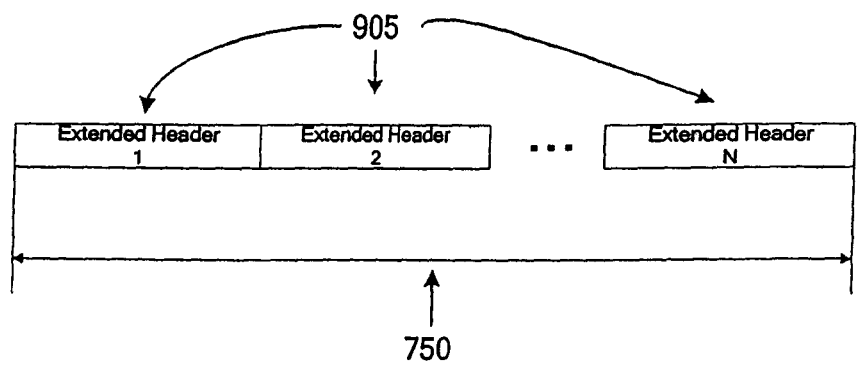
FIG. 9 illustrates the partitioning of a third level Extended Header frame into fourth level frames as defined by this invention.

The third level Extended Header frame 750 of the second level MAC frame 710 may consist of zero or more fourth level Extended Header frames 905 as illustrated in FIG. 9. The presence or absence of the first fourth level Extended Header frame 905 is indicated by fourth level Extended Header indication frame 830 of third level Frame Control frame 730. The presence or absence of each subsequent fourth level Extended Header 905 is indicated by the fifth level Next Extended Header frame 1005 in the header of the preceding fourth level Extended Header 905 frame. There are four different types of Extended Header frames 905, each of which has a different format.

Figure 10:
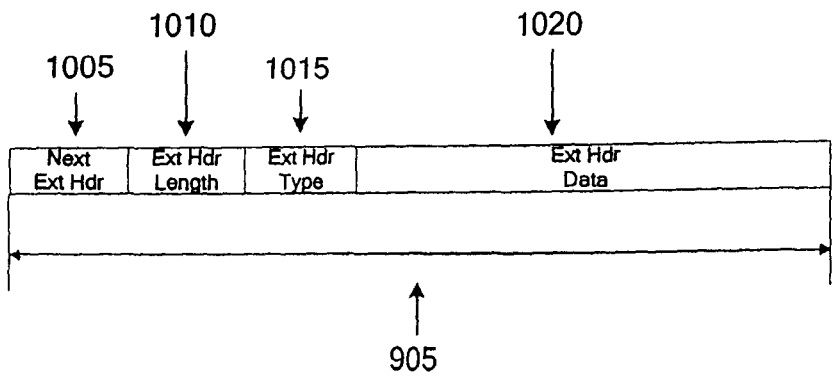
FIG. 10 illustrates the partitioning of a generic fourth level Extended Header frame into fifth level frames as defined by this invention.

As illustrated in FIG. 10, each fourth level Extended Header frame 905 consists of four generic elements. These elements are a fifth level Next Extended Header frame 1005, a fifth level Extended Header Length frame 1010, a fifth level Extended Header Type frame 1015 and a fifth level Extended Header Data frame 1020.

The fifth level Next Extended Header frame 1005 indicates the presence or absence of an additional fourth level Extended Header frame 905 following this fourth level Extended Header frame 905.

The fifth level Extended Header Length field 1010 indicates the number of octets in the fifth level Extended Header Data frame 1020.

The fifth level Extended Header Type field 1015 indicates the purpose of this particular fourth level Extended Header frame 905 and the subsequent format of the fifth level Extended Header Data frame 1020. There are five possible types of fourth level Extended Header frames which are Slot Info headers, Piggyback ACK headers, Piggyback Grant headers, Power Control headers and Future Grant headers.

Figure 11:
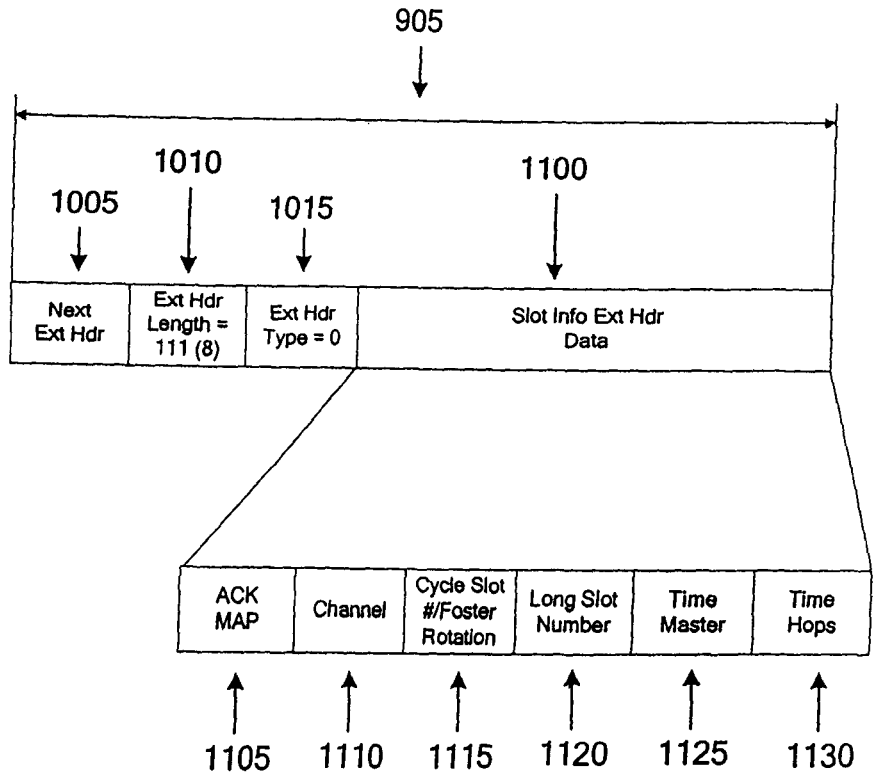
FIG. 11 illustrates the partitioning of a fourth level Slot Info Extended Header frame into fifth level and sixth level frames as defined by this invention.

The format of the first type of fourth level Extended Header frame 905 incorporates a fifth level Slot Info Extended Header frame 1100, as illustrated in FIG. 11. The contents of the fifth level Slot Info Extended Header Data frame 1100 consists of six sixth level frames: the ACK Map frame 1105, the Channel frame 1110, the Cycle Slot #/Foster Rotation frame 1115, the Long Slot Number frame 1120, the Time Master frame 1125 and the Time Hops frame 1130.

The sixth level ACK Map frame 1105 is a bit mapped frame used to acknowledge multi-cast packets which have been received by the FMN 102 transmitting the Slot Info Extended Header.

The sixth level Channel frame 1110 indicates the logical channel on which this first level frame is being transmitted. This value, in combination with the slot and super-frame numbers can be used to synchronize to the transmitting unit hopping sequence if frequency hopping is being used.

Figure 12:
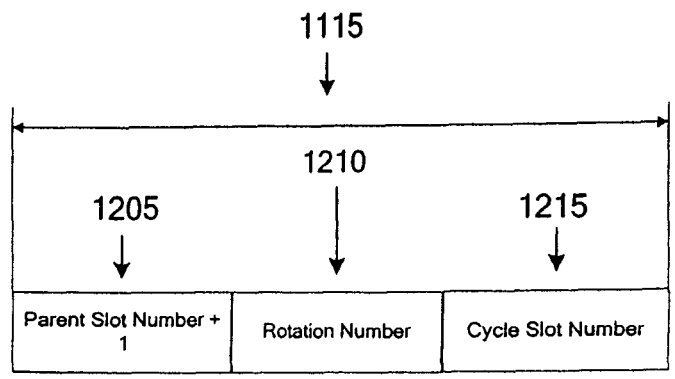
FIG. 12 illustrates the partitioning of a sixth level Cycle Slot #/Foster Rotation frame of a fourth level Slot Info Extended Header frame into seventh level frames as defined by this invention.

The sixth level Cycle Slot #/Foster Rotation frame 1115 consists of three seventh level frames as illustrated in FIG. 12. The first seventh level frame is the parent slot number frame 1205 which advertises whether the transmitting unit is a fostering MMR 101 or an FMN 102 and if it is the latter, this field indicates the slot number of the fostering MMRs 101 parent FMN 102. The second seventh level frame is the Foster Rotation Number frame 1210 which advertises the future position of the voice and data CAP slots for a MMR which is being fostered. The final seventh level frame is the Slot Rotation Cycle frame 1215 which is used by a fostering MMR 101 to advertise which slot rotation schedule it is currently employing.

The sixth level Long Slot Number frame 1120 of a Slot Info Extended Header indicates the current value of the 16 bit slot number.

The sixth level Time Master frame 1125 of a Slot Info Extended Header indicates the ID of time master of the cluster to which the transmitting unit is a member.

The sixth level Time Hops frame 1130 indicates the number of hops to the Time Master of the cluster.

Figure 13:
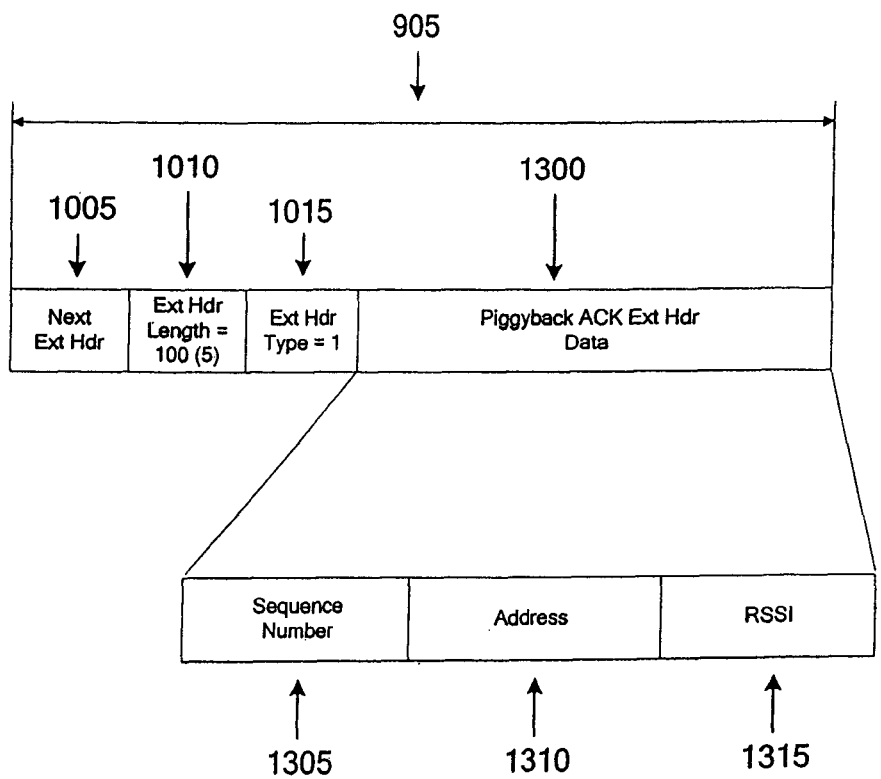
FIG. 13 illustrates the partitioning of a fourth level Piggyback Acknowledge (ACK) Extended Header frame into fifth level and sixth level frames as defined by this invention.

FIG. 13 illustrates the format of the second type of fourth level Extended Header frame 905. This type of frame incorporates a fifth level Piggyback ACK Extended Header Data frame 1300 which is used by the transmitting unit to acknowledge a previously received unicast packet. A sixth level Sequence Number frame 1305 indicates the sequence number of the packet being acknowledged. A sixth level Address frame 1310 indicates the Source ID which was received in the packet being acknowledged. The sixth level receive signal strength indication (RSSI) frame 1315 indicates the receive signal strength at which the packet being acknowledged was received.

Figure 14:
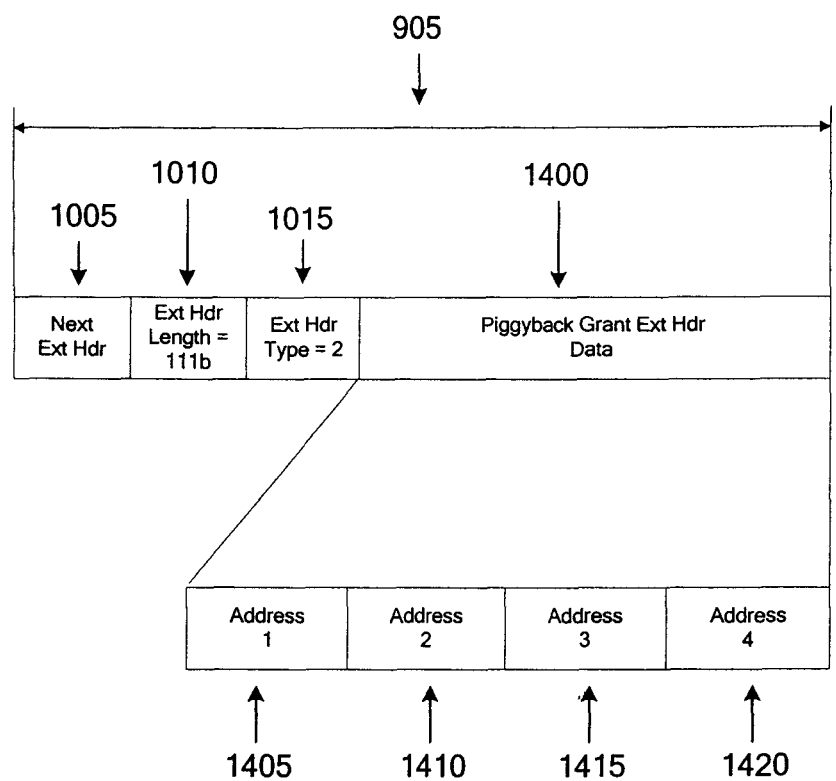
FIG. 14 illustrates the partitioning of a fourth level Piggyback Grant Extended Header frame into fifth level and sixth level frames as defined by this invention.

FIG. 14 illustrates the format of the third type of fourth level Extended Header frame 905. This type of frame incorporates a fifth level Piggyback Grant Extended Header frame 1400 which is used by the transmitting unit to indicate which nodes are allowed to transmit in the next first level CAP time slot 315. This arrangement provides a method by which bandwidth can be reserved for a unit which has multiple packets to send. Each of the four sixth level Address frames 1405, 1410, 1415 and 1420 will specify either a unicast address if the corresponding second level upstream time slot is reserved for a unicast transmission from a particular unit or to the special broadcast address if the corresponding second level CAP time slot is to be used as a CAP slot. In alternative embodiments, there may be more than four sixth level Address frames.

The fourth type of fourth level Extended Header frame 905 incorporates a fifth level Power Control Extended header frame which is not illustrated. This type of frame is used to communicate the current power setting of the transmitter. This is necessary since the power control algorithm may cause a unit to transmit at less than its nominal power setting and this information is needed to allow the receiving units to normalize the received signal strength readings associated with this unit. Since the receive power levels are used for position triangulation.

Figure 15:
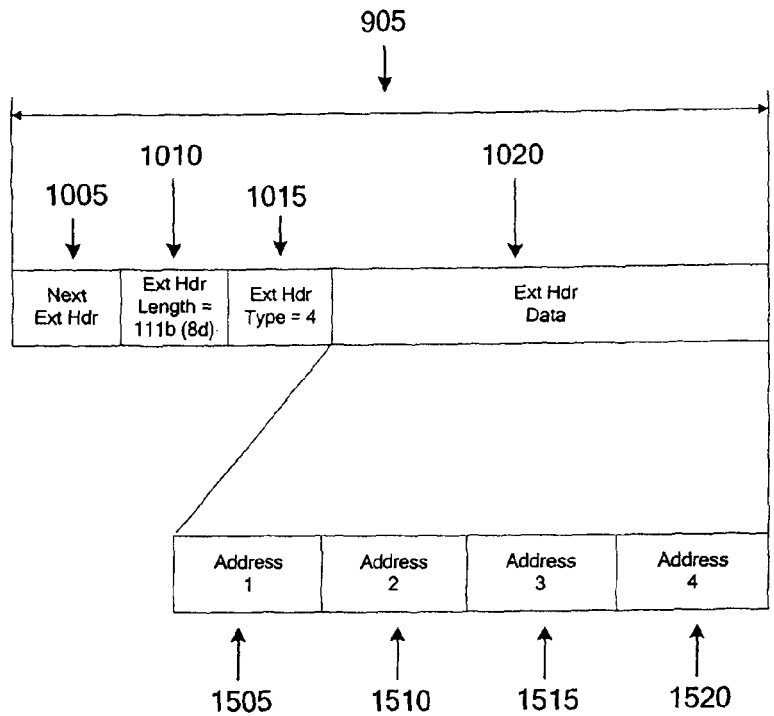
FIG. 15 illustrates the partitioning of a fourth level Future Grant Extended Header frame into fifth and sixth level frames as defined by this invention.

FIG. 15 illustrates the format of the fifth type of fourth level Extended Header frame 905. This type of frame incorporates a fifth level Future Grant Extended Header frame 1500 which is used to reserve second level CAP time slots 315 for the upstream two slots in the future. Its primary purpose is to prevent an FMN 102 from transmitting in the next second level CAP time slot and missing its guaranteed grant coming up in the second level time slot after that. Each of the four sixth level Address frames 1505, 1510, 1515 and 1520 will specify either a unicast address if the corresponding second level CAP time slot is reserved for a unicast transmission from a particular unit or to the special broadcast address if the corresponding second level CAP time slot is to be used as a CAP slot. In alternative embodiments, there may be more than four sixth level Address frames.

MAC Packet Types

There are three possible formats for the third level MAC payload frame 755 used on WMN 100. As mentioned above, the specific type of MAC packet is indicated in the fourth level Frame Type frame 805. These three third level frame types are Single Data Frames, Concatenated Data Frames and Sync Frames.

Figure 16:
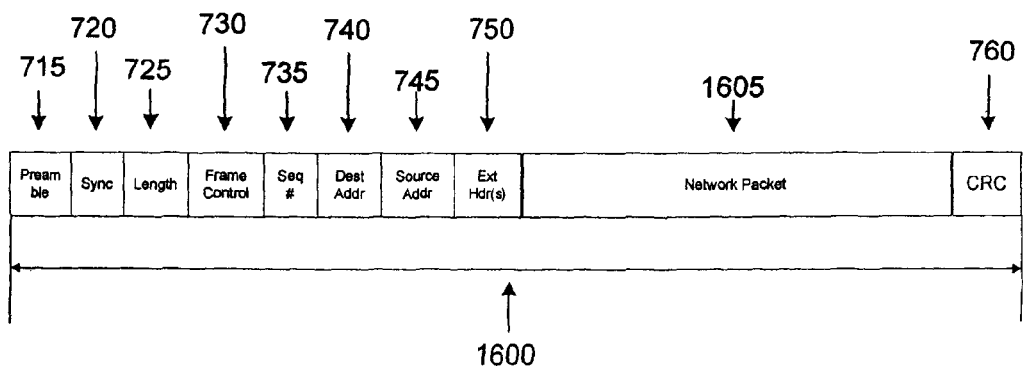
FIG. 16 illustrates the partitioning of a first level Single Data Frame Packet into second level, third level and fourth level frames as defined by this invention.

FIG. 16 illustrates the format of a first level Single Data frame 1600. The purpose of a first level Single Data frame 1600 is to transfer one and only one network packet. For this type of frame the third level MAC Payload frame 755 consists entirely of a single fourth level network packet frame 1605. The third level Length field 725 will indicate the length of the fourth level network packet frame 1605. The other third level fields of the first level Single Data frame 1600 will be used as described in the preceding sections.

FIG. 17 illustrates the format of a first level Concatenated Data frame 1700. This frame type is used to transfer zero, one or more fourth level network packet frames 1605 between units. For this type of frame, the third level MAC Payload frame 755 consists of zero, one or more Length/Network Packet pairs. Each of these pairs will consist of a fourth level Length frame 1705 and a variable length fourth level Network Packet frame 1605 The fourth level Length frame 1705 indicates the number of octets in the corresponding fourth level Network Packet frame 1605. The fourth level Network Packet frame 1605 contains the actual application layer information being transferred. The third level PHY Length frame 725 will indicate the number of octets in all of the fourth level Length/Network Packet pairs. The other third level frames of this type of first level packet frame are used as described in the preceding sections.

Figure 18:
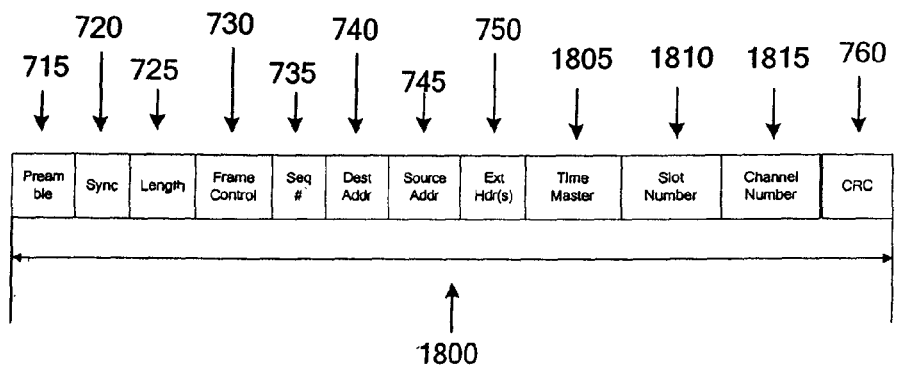
FIG. 18 illustrates the partitioning of a first level SYNC MAC frame into second level, third level and fourth level frames as defined by this invention.

FIG. 18 illustrates the format of first level Sync frame 1800. This type of frame may be sent during a first level FMN-to-FMN time slot 310 to facilitate adjacent FMNs 102 and mobile nodes in finding the network. The third level MAC Payload frame 755 for this first level frame type 1800 consists of a fourth level Time Master frame 1805, a fourth level Slot Number frame 1810 and a fourth level Channel Number frame 1815. The value of the fourth level Time Master frame 1805 is set to the network ID of the current time master of the transmitting unit. The value of the fourth level Slot Number frame 1810 is set to the current slot number for the cluster to which the transmitting unit belongs. The value of the fourth level Channel Number frame 1815 is set to the logical channel number on which the SYNC frame is being transmitted.

In alternative embodiments, more than one of any of the disclosed types of time slots and frames may be incorporated into the communications protocol formed with this invention.

In an emergency situation the need for reliable communications is paramount. For example, in a hazardous environment, such as underground, direct communications between two points is often made unreliable or impossible by destroyed infrastructure and/or blockage of line-of-sight by equipment and/or debris. By design, this invention creates a method by which the ad hoc mesh nodes automatically form and re-form in clusters to provide reliable network communications. This characteristic facilitates the natural creation of clusters of communication around FMN's 102 to provide an infrastructure and provides a method by which isolated pockets (clusters) of FMN's 102 can quickly reconnect with the main infrastructure. This invention further creates a protocol that provides a reliable wireless network formed by ad hoc mesh nodes. The communication protocol supports the creation and maintenance of a reliable network 100 including fixed and mobile nodes. This protocol provides methods by which mobile devices can communicate with other mobile devices and with Network Operations Center 105 while roaming freely through the network formed by the Fixed Mesh Nodes (FMN) 102. The protocol supports voice, data and text communications in emergency and non-emergency modes. In addition this protocol provides methods by which each infrastructure node and mobile node can be monitored and managed at remote Network Operations Center 105.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt the teaching of the present invention to a particular situation without departing from its central scope. Therefore it is intended that the present invention not be limited to the particular embodiments disclosed as the best mode contemplated for carrying out the present invention, but that the present invention include all embodiments falling within the scope of the appended claims.

What is claimed is:

1. A method for implementing a communications network protocol suitable for reliable voice and data communications in an underground, industrial, or hazardous area comprising:
providing a wireless mesh network (WMN) comprising ad hoc mesh nodes that automatically form and re-form in clusters to provide wireless network communications to support voice, data, text and network service for personnel working in the hazardous area;
wherein the wireless mesh network (WMN) comprises fixed mesh nodes (FMNs) and mobile nodes and each FMN provides creation and maintenance of the WMN by coordinating individual clusters within the WMN and routing data through the WMN between mobile nodes and a Gateway node for access to and/or from a remote Network Operations Center;
establishing dedicated bandwidth transmission opportunities for each FMN in a given cluster to forward packets to a neighbor node in the cluster and to establish contention-based transmission opportunities for the FMNs and the mobile nodes to join the cluster;
establishing contention-free transmission opportunities by providing a two-way medium for each node with a bonded frequency pair and associated contention-free time slot to provide a guaranteed time period during which an FMN transmits network packets to neighboring FMN(s) and to mobile units using the FMN as a parent to, wherein format for the contention-free time slot depends on voice or data dedication;
establishing contention-based transmission opportunities to join the cluster by providing a two-way medium for each node with a bonded frequency pair and associated contention-based time slot, wherein format for the contention-based time slot depends on voice or data dedication;
wherein distributing application layer packets is performed with high reliability and low latency to maintain reliable voice and data communications with mobile nodes carried by personnel and fixed or mobile sensors within the hazardous area and also with remote operation;
providing an intelligent flood routing technique with dynamic packet routing to ensure that at least one mobile node can seamlessly roam within the ad hoc mesh network;
wherein the intelligent flood routing technique immediately reacts to a mobile node roaming freely through the ad hoc mesh network and to removal of one or more FMNs with minimal or no loss of data since it does not establish static or semi-static routes for communication packets from a given source to a given destination;

wherein the intelligent flood routing technique eliminates circular loops and duplicate voice packets by storing a history of data packet sequence numbers and voice packet timestamps to remove large amounts of redundant traffic associated with flood routing wherein each FMN and each mobile node contains a communications network protocol for automatically forming an association with one or more neighbor FMNs, and wherein the ad hoc mesh network is based on cooperative negotiation and a dynamic parent-child relationship between nodes for determination of network time synchronization without a pre-determined time master, discovery and merging of adjacent ad hoc mesh networks, and routing techniques for voice, data and network status packets which react to network topology changes, such that when a communications link in the ad hoc mesh network degrades or fails, another FMN is automatically designated;

wherein when quality of a link between a mobile node and a parent FMN has degraded such that it is below a programmable threshold of acceptable operation, the mobile node seeks another parent which can provide a higher quality communication link;

wherein each fixed node and mobile node is monitored and managed at the remote Network Operations Center for dispatch, remote supervision, and tracking of personnel, as well as, monitoring, asset control, and management of wireless sensors and equipment;

wherein the ad hoc mesh network comprises at least one node cluster with (i) a plurality of peer-to-peer fixed mesh nodes (FMNs), one of which is a time master node, and (ii) at least one mobile mesh radio node;

establishing a super-frame time interval for all nodes in a cluster, wherein the super-frame time interval is time synchronized with the time master node for the cluster based on node ID ranking, and wherein child nodes will synchronize to their respective parent nodes' slot timing thus inheriting the time master's timing with some offset due to propagation delay:

wherein when a communications link in the ad hoc mesh network degrades or fails, another FMN is automatically designated as time master node based on node ID ranking;

establishing at least two time slots in a primary channel and secondary channel within the super-frame time interval;

assigning at least one of the time slots as a contention-based time slot for transmitting data to form parent-child associations to join the ad hoc mesh network by one or more of the plurality of FMNs and/or the at least one mobile mesh radio node;

assigning at least one of the time slots as an FMN to FMN contention-free time slot for transmitting network packets from one or more of the FMNs to a neighboring FMN that will use a transceiver to tune to frequencies associated with a transmitting FMN and receive packets and/or to any mobile mesh radio node associated with an FMN that will use a transceiver to tune to frequencies associated with a transmitting FMN and receive packets;

wherein for an FMN-to-FMN time slot not assigned to a neighbor, a node will use both transceivers to scan for other clusters to provide an improved time metric; and wherein each FMN will periodically puncture its own FMN-to-FMN time slot as well as a neighbors' assigned time slot(s) and contention access time slot to perform a scan operation for other clusters to provide an improved time metric.

2. The method of claim 1, wherein each of the at least one FMN to FMN time slots creates a reliable wireless digital communication to one or more neighbor nodes consisting of:
at least one pre-guard time slot to allow for clock drift between nodes;
at least one power amplifier ramp time slot to allow the FMN to reach full output power;
at least one primary time slot to transmit network packets to one or more listening neighbors;
at least one idle time slot for FMN power down of the FMN's transmitter to conserve power;
at least one sync time slot to aid scanning FMNs or mobile nodes to find and synchronize with the ad hoc mesh network; and
at least one post-guard time slot to turn off the FMN's transmitter and switch to receive mode.

3. The method of claim 1, wherein each fixed mesh node (FMN) transmits and receives over a pair of bonded, time-synchronized RF channels, one of which is designated as a digital voice channel and a second of which is designated as a digital data channel to provide quality of service mechanism and prevent an FMN from attempting to receive on one channel while the FMN is transmitting on the second channel.

4. A method for implementing a wireless digital communications network protocol for critical voice, data and real-time monitoring of conditions and equipment in an underground hazardous environment, the method comprising:
providing an ad hoc mesh network with a reliable two-way medium based on cooperative negotiation for establishing dedicated transmission opportunities to forward packets in an efficient manner as well as contention-based transmission opportunities to join;
wherein the ad hoc mesh network comprises at least one node cluster having a plurality of peer-to-peer fixed mesh nodes (FMN) and at least one mobile mesh radio node wherein each FMN and the at least one mobile mesh radio node contains the said communications network protocol to automatically form an association with one or more neighbor FMN's;
providing an intelligent de-centralized flood routing technique with dynamic routing to ensure that the at least one mobile mesh radio node can seamlessly roam throughout the ad hoc mesh network;
providing uni-cast and multi-cast voice, text and data packet transmissions;
providing a combined wireless and wired emergency communications system, including the ad hoc mesh network adapted for use with the communications network protocol;
establishing at least one super-frame time interval within the communications network protocol, each of which is of equal duration and each of which is time synchronized with a designated FMN time master for each cluster using a dynamic parent-child relationship among the FMNs that is not pre-determined;
establishing at least two time slots within each said super-frame time interval;
assigning at least one of said at least two time slots as a contention access period (CAP) time slot for transmitting data to form associations into the ad hoc mesh network by one or more of the plurality of FMN's and/or the at least one mobile mesh radio node;
assigning at least one of said at least two time slots as an FMN to FMN contention-free time slot for transmitting network packets from one or more of the plurality of FMN's to neighboring FMN's of the plurality of FMN's and/or to any mobile mesh radio nodes with which the FMN is associated;

wherein each of the at least one CAP time slots is formatted into at least one CAP data time slot or at least one CAP voice time slot to receive packets from transmitting mobile mesh radio nodes or other FMNs which are attempting to join the at least one node cluster, or scan for other node clusters wherein each CAP time slot further comprises:

at least one data TX on guard time slot for a radio transmitting in the CAP time slot to turn the radio's transmit circuitry on;

at least one data physical layer (PHY) frame time slot to transmit network packets to one or more listening neighbors;

at least one voice PHY frame time slot;

at least one data idle time slot after the transmitting radio has transmitted a last bit of variable length data; and at least one data TX off time slot for a radio transmitting in the CAP time slot to turn the radio's transmit circuitry off.

5. The method of claim 4, wherein each said data PHY frame time slots and each said voice PHY frame time slots further comprises:

at least one PHY header frame for bit synchronization of the data packet; and at least one media access control (MAC) frame to provide control and error correction functions.

6. The method of claim 5, wherein each said PHY header frame further comprises:

at least one preamble frame encoded as a set of alternating 1 and 0 bits to provide a means for receiving radios to reliably obtain bit synchronization on an incoming bit stream;

at least one sync frame consisting of a unique bit pattern which is preconfigured into all devices which is used by a receiving radio to obtain slot synchronization; and at least one length frame which indicates to a receiver a number of bytes to expect in the MAC frame.

7. The method of claim 5, wherein each said MAC frame further comprises:

at least one frame control frame which informs the receiving radio of a purpose and format of a remainder of the MAC frame;

at least one sequence number frame which allows for acknowledgement of individual MAC packets and for filtering of duplicate packets where the sequence number frame is set by a transmitter of the packet;

at least one destination address frame that specifies a network address of an intended recipient of the packet;

at least one source address frame that specifies a network address of a transmitting unit;

at least one extended header frame to provide a mechanism by which a sender can dynamically expand a MAC header with additional network information when needed;

at least one MAC payload frame which is context dependent; and at least one cyclic redundancy check (CRC) frame which provides the receiver with a method for detecting bits errors that occurred in demodulation of data bits in other frames.

8. The method of claim 7, wherein each said frame control frame further comprises:

at least one MAC frame type frame that indicates a purpose of the MAC frame and a format of the MAC payload frame, wherein MAC frame types are selected from single data frames, concatenated data frames, and sync frames;

at least one security enabled frame which indicates whether or not MAC layer security is enabled;

at least one frame pending frame which indicates whether a sending unit has additional frames to send to the same destination address;

at least one acknowledge (ACK) request frame which indicates whether the sending unit is requesting a MAC layer acknowledgement of this frame;

at least one intra-PAN frame which is reserved for future intra-PAN communications;

at least one extended header indication flag frame which, when set to true, indicates whether or not one or more extended header frames follows the Source Address frame;

at least one scan notify frame which indicates whether or not the transmitter will be performing a scan operation in the next time slot or will be performing a normal transmission in the next time slot;

at least one retry frame which indicates whether or not the frame is a first transmission or a subsequent transmission;

at least one destination mode frame which indicates a number of bits in the Destination Address frame;

at least one power control frame indicates a power level at which the transmitter is transmitting the packet; and at least one source mode frame which indicates a number of bits in the Source Address frame.

9. The method of claim 8, wherein if a flag of said extended header indication flag frame is set to true, each said extended header frame further comprises at least one extended header frame type selected from the group consisting of:

slot info header frame, piggyback ACK header frame which is used by the transmitting unit to acknowledge a previously received unicast packet, piggyback grant header frame which is used by the transmitting unit to indicate which nodes are allowed to transmit in a next first level CAP time slot, power control header frame which is used to communicate a current power setting of the transmitter, and future grant header frame which is used to reserve CAP time slots for the upstream two slots in the future.

10. The method of claim 9, wherein each said slot info header frame further comprises:

at least one ACK map frame used to acknowledge multicast packets which have been received by the FMN transmitting a Slot Info Extended Header;

at least one channel frame which indicates a logical channel on which the frame is being transmitted, the at least one channel frame, in combination with slot and superframe numbers, can be used to synchronize to a transmitting unit hopping sequence if frequency hopping is used;

at least one cycle slot number or foster rotation frame consisting of a parent slot number frame, a foster rotation number frame, and a slot rotation cycle frame;

at least one long slot number frame indicating a current value of a 16 bit slot number;

at least one time master frame indicating an ID of the time master FMN of the node cluster to which the transmitting unit is a member; and at least one time hops frame indicating a number of hops to the time master of the node cluster.

11. The method of claim 10, wherein each cycle slot number or foster rotation frame further comprises:

at least one parent slot number frame which advertises whether the transmitting unit is a fostering mobile mesh radio node or an FMN;

at least one foster rotation number frame which advertises a future position of the voice and data CAP time slots for a mobile mesh radio node which is being fostered; and at least one cycle slot rotation cycle frame which is used by a fostering mobile mesh radio node to advertise which slot rotation schedule the fostering mobile mesh radio node is currently employing.

12. The method of claim 9, wherein each said piggyback ACK header data frame further comprises:

at least one sequence number frame indicating a sequence number of a packet being acknowledged;

at least one address frame indicating a Source ID which was received in the packet being acknowledged; and at least one received signal strength indication (RSSI) frame with a received signal strength at which the packet being acknowledged was received.

13. The method of claim 9, wherein each piggyback grant header frame is configured to reserve bandwidth for any one of the nodes having multiple packets to send and wherein each piggyback grant header frame further comprises at least four address frames to specify either a unicast address if a corresponding upstream time slot is reserved for a unicast transmission or a special broadcast address if a corresponding upstream time slot is to be used as a CAP slot.

14. The method of claim 9, wherein each future grant header frame is configured to prevent an FMN from transmitting in a next CAP time slot and missing the FMN's guaranteed grant coming up in a time slot after that and wherein each future grant header frame further comprises at least four address frames to specify either a unicast address if a corresponding time slot is reserved for a unicast transmission or a special broadcast address if the corresponding time slot is to be used as a CAP slot.

15. The method of claim 7, wherein each said MAC payload frame is one type selected from the group consisting of single data frame type, concatenated data frame type, and sync frame type where:

the single data frame type is used to transfer one and only one network packet between units;

the concatenated data frame type is used to transfer zero, one or more network packet frames between units; and the sync frame type is sent during an FMN-to-FMN time slot to facilitate adjacent FMNs and mobile mesh radio nodes in finding the ad hoc mesh network.

16. The method of claim 15, wherein said single data frame type of said MAC payload frame comprises a single network packet.

17. The method of claim 15, wherein said concatenated data frame type of said MAC payload frame further comprises:

at least one length frame indicating a number of octets in a corresponding network packet frame; and at least one network packet frame containing an actual application layer information being transferred.

18. The method of claim 15, wherein said sync frame type of said MAC payload frame further comprises:

at least one time master frame which is set to a network ID of a current time master FMN of the transmitting unit;

at least one slot number frame which is set to a current slot number for a cluster to which the transmitting unit belongs; and at least one channel number frame which is set to a logical channel number on which the sync frame type is being transmitted.

19. The method of claim 1, further comprising of a periodic scanning operation to discover active nodes of another node cluster having overlapping time slots to obtain different associations between nodes to re-form the at least one node cluster such that individual nodes change from one node cluster to another node cluster and wherein the periodic scanning operation is performed during unused time slots, or by capturing a time slot of one of the at least one fixed or at least one mobile mesh radio nodes and replacing the operation otherwise assigned to a captured time slot with the periodic scanning operation.

20. The method of claim 1, further comprising of seamless data packet routing within the ad hoc mesh network, each packet having a packet header, with the seamless packet routing comprising of:

analyzing each of the packet headers including timestamp and sequence number;

recording a history of packet sequence numbers and packet timestamps;

determining based on the packet header whether to forward the packet to adjacent nodes;

discarding packets with the same sequence number before a programmable timeout period to eliminate circular loops and duplicate packets; and flood routing non-redundant packets to adjacent nodes in the ad hoc mesh network.

21. The method of claim 1, further comprising of seamless roaming by one or more of the at least one mobile mesh radio nodes by measuring quality of a channel link between the mobile mesh radio node and a parent FMN to which the mobile mesh radio node is connected as compared with quality of available channel link with other FMNs, such that the mobile mesh radio node automatically selects and connects to a different FMN having a better quality channel link available as the mobile mesh radio node travels through the ad hoc mesh network.

22. A method for implementing a communications network protocol comprising:

providing a combined wireless and wired emergency communications system with an ad hoc mesh network with two-way medium for establishing contention-free dedicated transmission opportunities to forward packets as well as contention-based transmission opportunities to join;

wherein the ad hoc mesh network comprises at least one node cluster with (i) a plurality of peer-to-peer fixed mesh nodes (FMNs), one of which is a time master node, and (ii) at least one mobile mesh radio node;

wherein each FMN and each mobile mesh radio node contains a communications network protocol for automatically forming an association with one or more neighbor FMNs, and wherein the ad hoc mesh network is based on cooperative negotiation and a dynamic parent-child relationship between nodes, such that when a communications link in the ad hoc mesh network degrades or fails, another FMN is automatically designated as the time master node;

providing an intelligent flood routing technique with dynamic packet routing to ensure that the at least one mobile mesh radio node can seamlessly roam throughout the ad hoc mesh network formed by the FMNs;

establishing a super-frame time interval for all nodes in a cluster, wherein the super-frame time interval is time synchronized with the time master node for the cluster;

establishing at least two time slots within the super-frame time interval;

assigning at least one of the time slots as a contention-based time slot for transmitting data to form associations to join the ad hoc mesh network by one or more of the plurality of FMNs and/or the at least one mobile mesh radio node; and assigning at least one of the time slots as an FMN to FMN contention-free time slot for transmitting network packets from one or more of the FMNs to a neighboring FMN and/or to any mobile mesh radio node with which an FMN is associated;

wherein each of the at least one FMN to FMN time slots creates a reliable wireless digital communication to one or more neighbor nodes consisting of:

at least one pre-guard time slot to allow for clock drift between nodes;

at least one power amplifier ramp time slot to allow the FMN to reach full output power;

at least one primary time slot to transmit network packets to its listening neighbors;

at least one idle time slot for FMN power down of its transmitter to conserve power;

at least one sync time slot to aid scanning FMNs or mobile nodes to find and synchronize with the ad hoc mesh network; and at least one post-guard time slot to turn off its transmitter and switch to receive mode.

* * * * *